Figure 1:
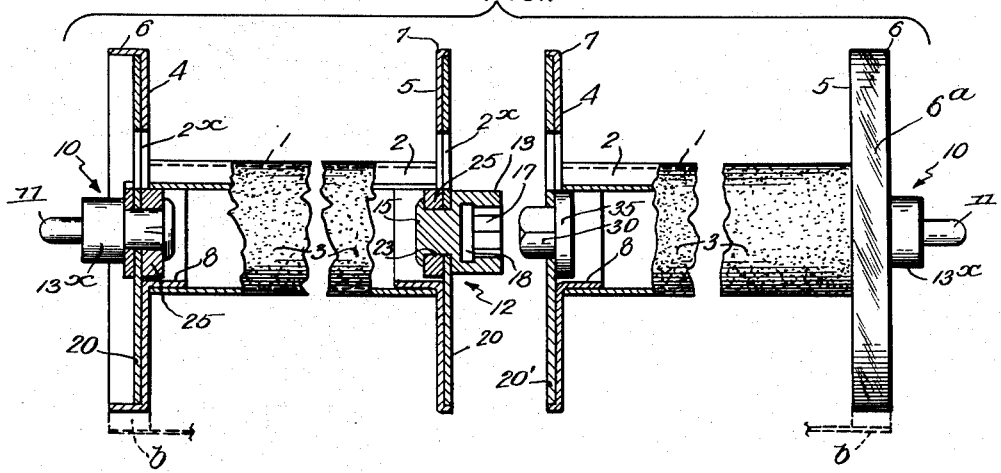

April 28, 1953

W. BIXBY 2,636,695

YARN SPOOL, HEAD AND BEARING ELEMENTS
THEREFOR AND METHOD OF MAKING
Filed Oct. 19, 1950

INVENTOR
WALTER BIXBY

BY Emery, Booth, Townsend,
Miller & Widner ATTYS.

Patented Apr. 28, 1953

2,636,695

UNITED STATES PATENT OFFICE 2,636,695

YARN SPOOL, HEAD AND BEARING ELEMENTS THEREFOR AND METHOD OF MAKING

Walter Bixby, Boston, Mass., assignor to Shawmut Engineering Company, Boston, Mass., a corporation of Massachusetts Application October 19, 1950, Serial No. 191,062

3 Claims. (Cl. 242—123)

1

This invention concerns yarn spools and especially those for holding supplies of tufting yarns in the manufacture of Axminster rugs and other tufted or pile fabrics. It aims to improve the construction of such spools in various respects, and particularly as to the spool ends or heads and the bearing means thereat whereby a plurality of the spools are adapted to function as a rotational unit when installed upon a spool carrier or so-called tube-frame for use in a loom.

Figures 2, 3:
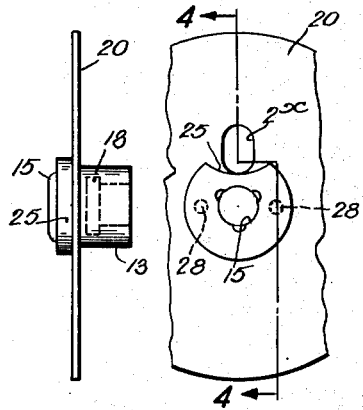
Figure 4:
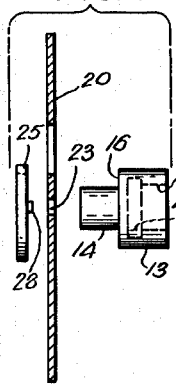
Figure 9:
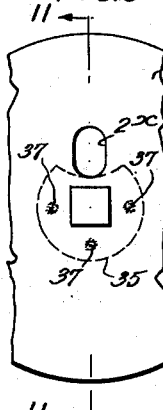
Figure 11:
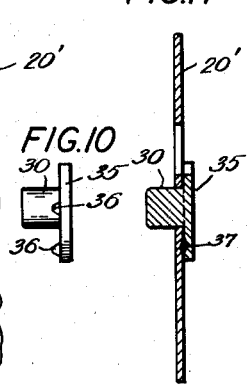
Figure 8:
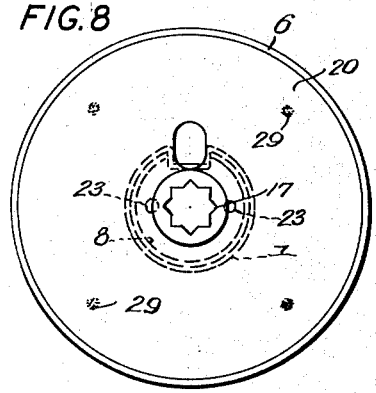
Figure 5:
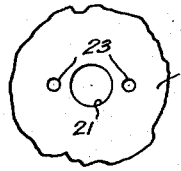
Figure 6:
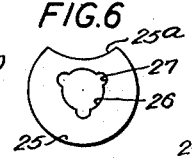
Figure 7:
Figure 13:
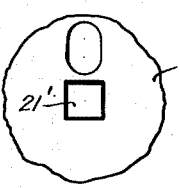
Figure 12:
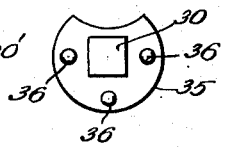

In the drawings illustrative of the invention:

Fig. 1 shows a plurality of axially interlocking spools, with head portions in longitudinal section;

Figs. 2 to 7 show a unitary bearing assembly such as that at the left center in Fig. 1 and wherein Fig. 2 is a side elevation of the assembled bearing unit, Fig. 3 is an end view of the same as if looking from the left onto Fig. 1, Fig. 4 is an exploded view of the bearing elements with the mounting plate in section as on the line 4—4 of Fig. 3, Fig. 5 shows a central portion of said plate before assembly, Fig. 6 is an end view of a connector or header piece separately, and Fig. 7 shows a central portion of the unit in course of assembly;

Fig. 8 is an end elevation of a complete spool head equipped with the socket type bearing means of Figs. 2 to 7; and Figs. 9 to 13 illustrate a bearing unit complementary to that of Figs. 2 to 8, and as at the right center in Fig. 1, and wherein Fig. 9 is an end view of the assembled unit as seen from the left in Fig. 1, Fig. 10 shows separately in elevation a combined gudgeon and header piece or fastener element, Fig. 11 is a section as on the line 11—11 of Fig. 9, Fig. 12 is an end view of the conjoint gudgeon and header as if looking from the left onto Fig. 10, and Fig. 13 shows a central portion of the mounting plate before assembly.

Referring first to Fig. 1 the spools as there shown comprise each a barrel 1 on which the supplies of tufting yarns are to be wound and held in condition to be drawn upon when the spools and the carrier or frame holding them are presented at the weaving point in the loom. The spool barrels are illustrated as hollow metal tubes each with the usual longitudinal channel 2 for receiving the clamping bar (not shown) for the

2 inner ends of the yarn series to be wound onto the spool. To assist in retaining the individual yarns and the mass thereof against displacement relative to the barrel both rotatively and particularly in the axial direction the cylindrical outer surface of the barrels are specially provided with an anti-slip formation as represented by the stippling at 3, on Fig. 1. Such yarn gripping surface means comprises a multiplicity of minute irregularities, indentations and intervening eminences, effected as by the application of sand blasting more or less uniformly over the entire barrel surface, whereby the outer skin and the natural glossy surface character of the metal is roughened or interrupted.

The opposite ends of each spool are provided with yarn-retaining heads. Each such head comprises a main circular plate 4 or 5 having outfacing peripheral flanges 6 and 7 respectively. The spool head plates 4 and 5 are centrally apertured and formed with inturned collars 8 engaged with and rigidly connected to the barrel ends as by spot welding.

It will be noted in Fig. 1 that the spool head flanges 6 at the outer ends of a spool series are of substantial longitudinal extent, adequate to present an appropriate braking surface for cooperation with the brake means of the spool carrying frame, shown dotted at b, Fig. 1, whereby the spools are held against unintentional turning in the supporting bearings yet will provide for tensioned withdrawal of short lengths of the yarns as required in the weaving. In this connection the cylindrical outer surfaces of these outer end head flanges 6 desirably are specially formed for moisture resistance and to aid in maintaining a uniform braking action. For this purpose said flanges 6 are externally machined to present an accurate cylindrical surface and are rust-proofed as by coating them with a plating of chrome over base plating 6a of nickel and/or copper. In other instances at least the flange portions 6 of the head plates 4, 5 may be of a stainless steel and given a polished finish at the outer flange surfaces. It is found in practice that the accuracy of the spool retarding action is thus greatly improved particularly in mills subject to high atmospheric humidity.

The end heads of each spool include bearing means for rotatively supporting the spools on the carrier frames. Such bearing means at the outer ends of end spools of a series are of a type as indicated generally at 10, 10, Fig. 1, including projective pintles 11 for rotative reception in the outer end bearings of the frame or carrier. For some narrow work a single spool may be adequate, in which case the opposite end bearings will each be of this pintle form. Since it is inconvenient to extend the individual spools beyond say 54 in. or six-quarter length, while much of the Axminster carpet and like pile fabric weaving is wider than such single-spool length, a plurality of spools is required, two, three, four or more spools being disposed in axial line on the supporting carriers or tube-frames. In order that the entire plurality of spools for any given carrier will rotate as a unit the adjacent ends of two or more spools are provided with means not only to afford them rotative bearing support but also to couple them in a manner to prevent rotative turning movement between them and to compel them to turn accurately as a unit. Accordingly the spool-end bearing means for all but the outer ends of the end spools of a series are constructed to afford an angular inter-connective or clutching function as well as that of rotative support.

It should here be noted that as to certain features the improved yarn-spool structure of the present invention is applicable in connection with different axial bearing elements at the spool heads, whether of the outer pintle type 10 or of the inter-connective inner end type, as at the central portion of Fig. 1 and in the following views. Further, as to the inner or intermediate bearing means, the interlocking formations may be of a universal form, such that any two spools may be adjoined at the inner ends, or they may be male and female as here shown by way of example.

Referring now to the left half of Fig. 1 and to Figs. 2 to 8, the female bearing assembly or unit there illustrated comprises a socketed journal or hub element indicated generally at 12, one of which is seen separately before assembly at the right in Fig. 4. It includes a socket portion 13 and a rivet-like shank 14 adapted to be headed over in the assembled condition as at 15, Figs. 1, 2 and 3. This socket element 12 desirably is rotatively formed as in an automatic screw machine, to provide an accurately cylindrical rotative bearing surface about the outer circumference of the socket portion 13, for reception in one of the intermediate bearing brackets (not shown) of a yarn-carrier or tube-frame. For manufacturing economy the shank 14 also is turned as in the screw machine, resultantly being circular in cross-section.

In order to obtain a rigid angular interlock between the round shanked bearing element 12 and the mounting parts, the bearing assembly further comprises a main mounting and locating plate 20 in the form of a circular sheet metal disc dimensioned to fit snugly within the peripheral flange 7 of the particular spool head plate 5. This mounting plate 20 has a circular central aperture 21, Fig. 5, accurately sized to fit tightly over the shank 14 of the socket element 12. The latter thus is accurately centered with respect to the mounting plate 20 and hence also with respect to the spool head as a whole, the plate 20 being centered in the head by reason of the flange 7. The socket element 12 in turn is rigidly and positively connected to the mounting plate 20, by novel means insuring against relative rotation between them under any normal stresses of intended use.

Such connecting means in accordance with the invention includes a central header piece or fastener element 25 comprising a button or washer-like metal body, seen separately at the left in Fig. 4 and in Fig. 6. This header piece 25 is itself centrally apertured upon a radius conformant to that of the socket element shank 14, as at 26.

This central aperture 26 includes radial enlargements or recesses 27 spaced angularly around the aperture, three being here shown, in equally spaced relation. The header piece 25 and mounting plate 20 are provided with further positively interengageable means affording a locking connection between them, with the locking action effected at a substantial radial distance from the spool axis, whereby a proportionately increased leverage is availed of for resisting relative turning between the parts.

Accordingly the mounting plate 20 is formed with one or more locking recesses or apertures 23, Figs. 4 and 6, two being shown in this instance, respectively at opposite sides of the central plate aperture 21. For co-operation with these locking apertures, which may be deep recesses or through holes, the header piece 25 has a like number of similarly radially spaced and conformantly proportioned pins or bosses 28, of a length to extend well into or through the receiving apertures 23 of the header piece. These projections 28 may be formed by striking out the metal at the points in question.

As earlier mentioned the spool barrels 1 generally have a longitudinal channel 2 for a yarn lock. The spool head plates 4, 5 and the associated mounting plate 20 of the bearing assembly are apertured as at $2x$ for reception of such yarn-locking rod. To avoid blocking such spool head aperture $2x$, the header piece 25 is cut away at the adjacent edge portion as at 25a.

By reference to Fig. 4, showing the bearing unit parts prior to assembly and by comparison of the same with Fig. 1 and Figs. 2 to 5, it will be seen that in the assembling operation the shank 14 of the socket element 12 is passed through the central aperture 21 of the carrier plate, so that the circumferential shoulder 16 at the inner end of the socket portion 13 firmly abuts the mounting plate 20 around the margin of the central receiving aperture 21 thereof. The header piece 25 is installed on the projecting end of the shank 14, with the lock pins 28 aligned with and at least partly entered into the locking apertures 23 therefor in the plate 20. The three component parts of the bearing assembly are then rigidly integrated by subjecting them to axial pressure in the nature of a die stamping operation, employing a female die or stamping tool having a central aperture of less diameter than the shank 14 end. The tool is pressed onto and over the shank 14, which may be of relatively soft metal stock, so that the metal thereof is forced inwardly and laterally into projective locking engagement with said radial aperture enlargements 27, substantially filling the same and positively intersecuring the header piece 25 and the socketed bearing element 12 against relative turning. The same stamping action also spreads and flattens the outer marginal portion of the shank end and sets it over into a rivet-like head formation as at 15, Figs. 1, 2 and 3. Any remaining central projecting portion of the shank, such as at 14', Fig. 7, may be removed. At the same time and in the one operation the pins 28 at the inner face of the header piece 25 are forced home in the plate locking apertures 23 to complete the positive interlock between the header piece 25 and the plate 20. Thus the header piece 25 being itself locked both to the plate 20 and to the bearing element 12 creats a positive lock between them.

By reason of the described construction and manner of assembly the resulting bearing unit, shown separately in Fig. 2 before installing on a spool head plate 5, affords a strong mechanical interlock between the several parts, with radial leverage factors adequate to resist even abnormal torque stresses. The described structural union is such that welding of the bearing assembly may be dispensed with. This unit is then centrally installed flatwise within the flange 7 of a spool head plate 5, where it is secured by a number of spot welds as indicated at 29, Fig. 8.

Under the invention this feature of header piece affording an interlock between a central bearing element and a mounting plate is applicable to any of the forms or types of bearing elements including the pintle type 10 for the outer ends of outer spools of a series. Thus as shown at the left in Fig. 1 the unit comprises a header piece 25 as in Figs. 2 to 7, the bearing element proper having a solid rather than a socketed head, as at 13x, and being oppositely extended to form the pintle 11.

Referring again to Figs. 2 to 8, the socket element 12 of the female bearing unit there shown is formed to receive and lock with a non-round post or gudgeon 30 such as that of the left end of the right spool of Fig. 1, illustrated as square in cross-section. The receiving seat 17 of the bearing socket portion 13 accordingly is shaped and proportioned for fitting reception of such square gudgeon, and herein with a minimum of aligning rotation as between the adjoined spools. Accordingly the socket seat 17 is in the form of an eight-pointed serration or star as defined by superposed squares angularly offset 45° with respect to each other. Gudgeon seating positions are thus available at each 45° around the socket, and relative turning between socket and gudgeon in one or the other direction, need never be more than half that angle or 22½°. As obvious from Fig. 8, such socket formation requires the provision of some sixteen longitudinal faces paralleling the bearing axis. As previously noted the socket element desirably is formed on an automatic screw machine and in that connection the forming of the socket is facilitated by axial entry of a properly formed broaching tool or reamer. To make possible such socket forming operation the inner end of the hollow portion of the socket is in the course of the screw machining undercut as at 18, Figs. 1, 2 and 4, thereby affording a clearance space or pocket inwardly upon the serrated socket portion 17. This permits the forming tool to be entered to the full depth of the serrations at 17 and provides clearance space for the metal chips to be pushed inwardly ahead of the tool. This annular internal enlargement 18 subsequently promotes the interlocking engagement of the spool heads without interferent obstruction by lint or dirt, any ordinary accumulation of which may be forced inwardly into the pocket 18 ahead of the entering gudgeon 30.

Referring now to the spool head structure having the male form of interlocking bearing assembly, as at the right central portion of Fig. 1 and in Figs. 9 to 13, such assembly insert is similar to that already described in that it again includes a mounting plate 20', a central axially projective bearer part 30 and a connective header piece 35. In this instance the bearing proper or gudgeon 30 and the header piece 35 are initially integrally formed of a single piece of metal stock.

In contrast to the turned or screw machined cylindrical socketed bearing 12 of the earlier views this dual bearer and connective element 30, 35 is fabricated as by die casting or stamping from a soft metal bar stock. The flat inner face of the header piece 35 is formed with a plurality of locating and connective weld nubbins 36. Three such nubs 36 are here shown, equally angularly spaced centrally about the header piece, each at a substantial radial distance from the bearing axis; see particularly Fig. 12.

For receiving and non-rotatively supporting the shank-like gudgeon of the dual element 30, 35, the mounting plate 20' has the central aperture 21' of non-round conformation, in this instance square and of a size for snug reception of the gudgeon. Thus the non-round shape of the gudgeon is here utilized in the formation of a positive interlock as between the bearer part and the mounting plate 20'. Non-rotative securement is further insured by means of the header piece 35 and the weld-assisting nubs 36 thereof at the widely spaced radial distances indicated.

In assembling this male form of bearing unit, noting Figs. 9 and 11, the gudgeon part 30 is installed in the square hole 21' of the mounting plate 20' and the header piece 35 is pressed home against the portion of the mounting plate 20' immediately marginal to the receiving aperture. A spot welding tool having the electrodes shaped and arranged for multiple spot welding at the region of the nubbins 36 is applied to the assembly under pressure. The header piece 35 and the mounting plate 20' are thus integrally connected by the resultant welds as indicated for example at 37, Figs. 9 and 11.

It will be understood that my invention, either as to product, means, or method, is not limited to the exemplary embodiments or steps herein illustrated or described, and I set forth its scope in my following claims.

1. A bearing assembly unit for centered flatwise connection at the outer face of a yarn spool head plate, said unit comprising a mounting plate conformant to the spool head plate and having a central aperture of non-round form, a bearing element including a non-round shank conformant to and fitted through said aperture and a non-round bearer member for interlocking reception in a like-formed bearing socket of another spool, and a header element comprising a flat metal body integrally formed with said bearing element and adapted to abut flatwise at the inner face of the mounting plate, the abutting face of said header element having one or more weld nubbins spaced radially from the bearing axis and affording rigid weld connection between the header element and the mounting plate.

2. The method of making end head structures for tufting yarn spools for Axminster and like looms which comprises forming a central non-round aperture in a sheet-metal mounting plate, integrally forming of metal a conjoint bearing, shank and header piece with the bearing and shank conformant to the non-round plate aperture, fitting the bearing through and the shank into said aperture so as to flatwise abuttively interengage the header piece and the plate, and spot welding the header piece and plate together at points distributed around and spaced radially beyond the shank.

3. A bearing assembly unit for centered flatwise connection at the outer face of a yarn spool head plate, said unit comprising a mounting plate conformant to the spool head plate and having a central aperture of non-round form, and an axially extending bearing element for central assembly with the mounting plate, said bearing element having an intermediate portion of non-round section conformant to and fitted through the non-round central aperture of the mounting plate and having integrally formed at the respective ends thereof at opposite faces of the mounting plate spool bearing means and radially projecting header means flatwise abutting and rigidly welded to the adjacent face of the mounting plate.

WALTER BIXBY.

References Cited in the file of this patent

UNITED STATES PATENTS

| Number | Name | Date |
|---|---|---|
| 920,611 | Mosley | May 4, 1909 |
| 1,554,335 | Crossland | Sept. 22, 1925 |
| 1,874,188 | Hathaway | Aug. 30, 1932 |
| 1,980,586 | Hathaway | Nov. 13, 1934 |
| 2,020,243 | Hathaway | Nov. 5, 1935 |
| 2,081,331 | Hathaway | May 25, 1937 |
| 2,365,772 | O'Malley | Dec. 26, 1944 |